United States Patent
Ramakrishnan et al.

(10) Patent No.: US 12,184,088 B1
(45) Date of Patent: Dec. 31, 2024

(54) CASE DETECTION FOR WIRELESS POWER TRANSFER LOSS ESTIMATION

(71) Applicant: Apple Inc., Cupertino, CA (US)

(72) Inventors: Shubha Ramakrishnan, San Jose, CA (US); Adam L Schwartz, Redwood City, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/166,832

(22) Filed: Feb. 9, 2023

Related U.S. Application Data

(60) Provisional application No. 63/376,230, filed on Sep. 19, 2022.

(51) Int. Cl.
  *H02J 50/60* (2016.01)
  *H02J 50/12* (2016.01)
  *H02J 50/80* (2016.01)
  *H04B 5/79* (2024.01)

(52) U.S. Cl.
  CPC .............. *H02J 50/60* (2016.02); *H02J 50/12* (2016.02); *H02J 50/80* (2016.02); *H04B 5/79* (2024.01)

(58) Field of Classification Search
  CPC . H02J 50/12; H02J 50/60; H02J 50/80; H04B 5/79
  USPC ........................................................ 307/104
  See application file for complete search history.

(56) References Cited

U.S. PATENT DOCUMENTS

| | | | | |
|---|---|---|---|---|
| 10,581,282 B2* | 3/2020 | Lovas | ..................... | H02J 50/10 |
| 10,771,114 B2* | 9/2020 | Louis | ..................... | H02J 50/60 |
| 11,342,796 B2* | 5/2022 | Tian | .......................... | H04B 5/73 |
| 11,437,864 B2* | 9/2022 | Kim | .......................... | H02J 50/60 |
| 11,496,001 B2* | 11/2022 | Sherman | ................. | H02J 50/10 |
| 11,848,572 B2* | 12/2023 | Kim | .......................... | H02J 50/12 |
| 2019/0068001 A1 | 2/2019 | Lovas et al. | | |
| 2019/0349028 A1 | 11/2019 | Louis | | |
| 2020/0083754 A1 | 3/2020 | Tian et al. | | |
| 2021/0203193 A1 | 7/2021 | Kim et al. | | |
| 2022/0077719 A1 | 3/2022 | Sherman et al. | | |
| 2022/0247230 A1 | 8/2022 | Kim et al. | | |

OTHER PUBLICATIONS

International Search Report and Written Opinion for PCT Application No. PCT/US2023/032667 dated Jan. 22, 2024; 11 pgs.
International Search Report and Written Opinion for PCT Application No. PCT/US2023/032763 dated Dec. 20, 2023; 12 pgs.

* cited by examiner

*Primary Examiner* — Hal Kaplan
(74) *Attorney, Agent, or Firm* — FLETCHER YODER PC

(57) ABSTRACT

A wireless power transfer device can include a coil that couples to a corresponding coil of a counterpart device to facilitate wireless power transfer, a power converter coupled to the coil, and controller and communication circuitry that monitors one or more observable parameters associated with the wireless power transfer to detect a presence of a foreign object that is not the counterpart device and controls the power converter responsive to detection of the foreign object. The controller and communication circuitry can perform foreign object detection based on power accounting that includes estimating friendly metal losses associated with the counterpart device. The controller and communication circuitry can interrogate a machine readable tag associated with a case of the counterpart device and can receive from the machine readable tag information about the presence or properties of the case. The machine readable tag can be an NFC tag.

24 Claims, 3 Drawing Sheets

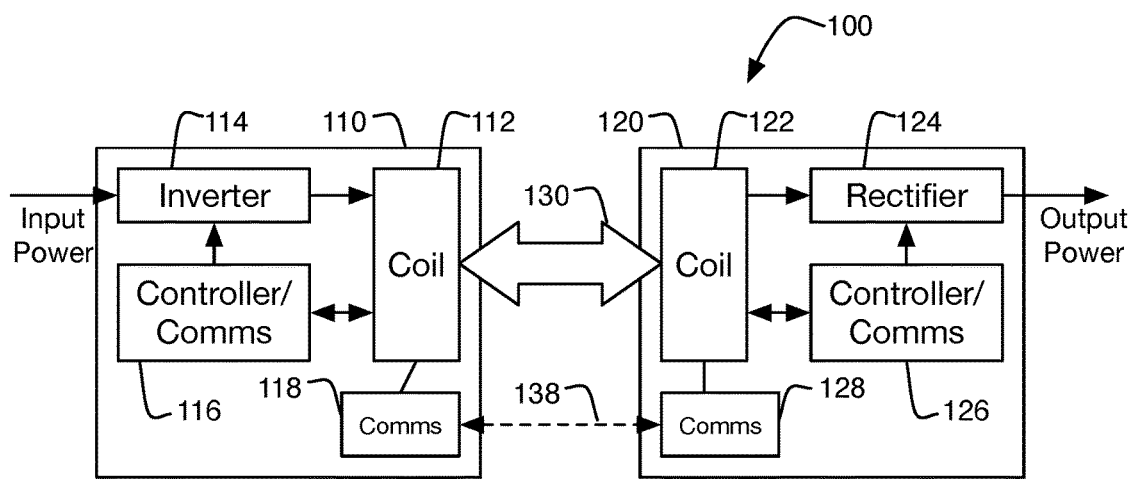
FIG. 1
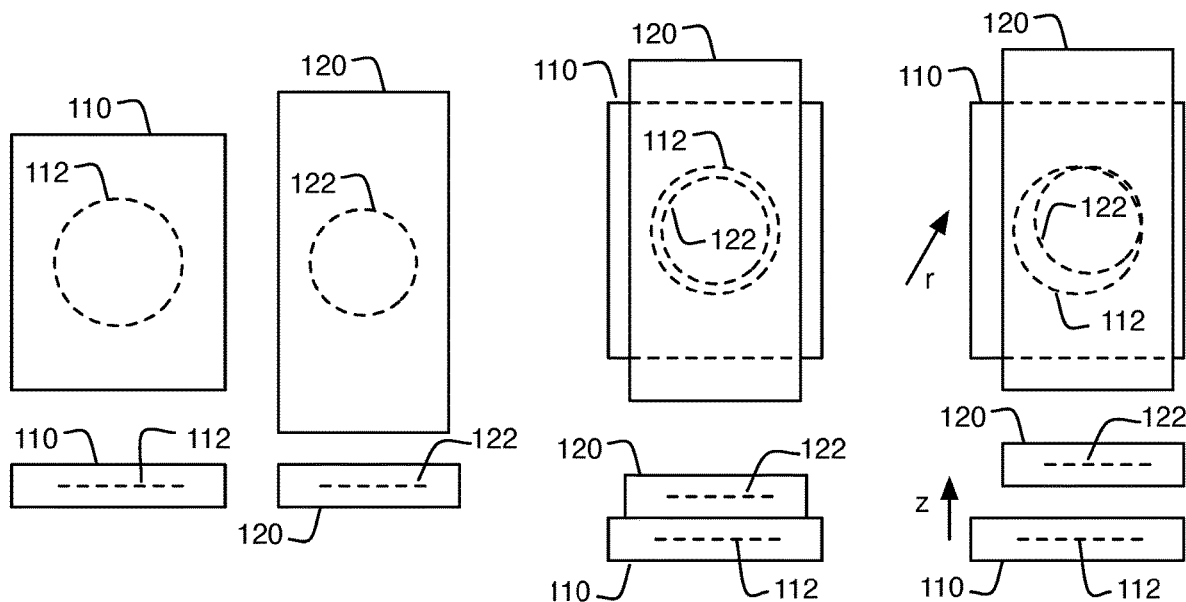
FIG. 2A  FIG. 2B  FIG. 2C

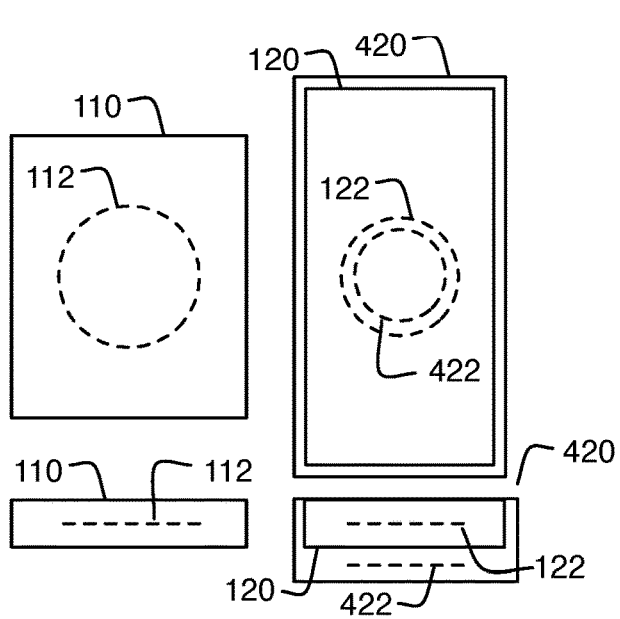
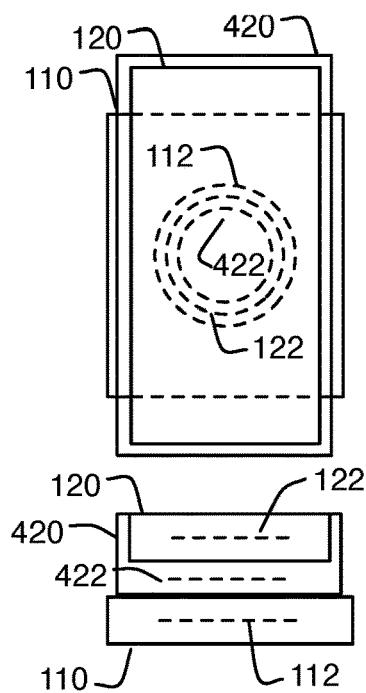
FIG. 4A  FIG. 4B
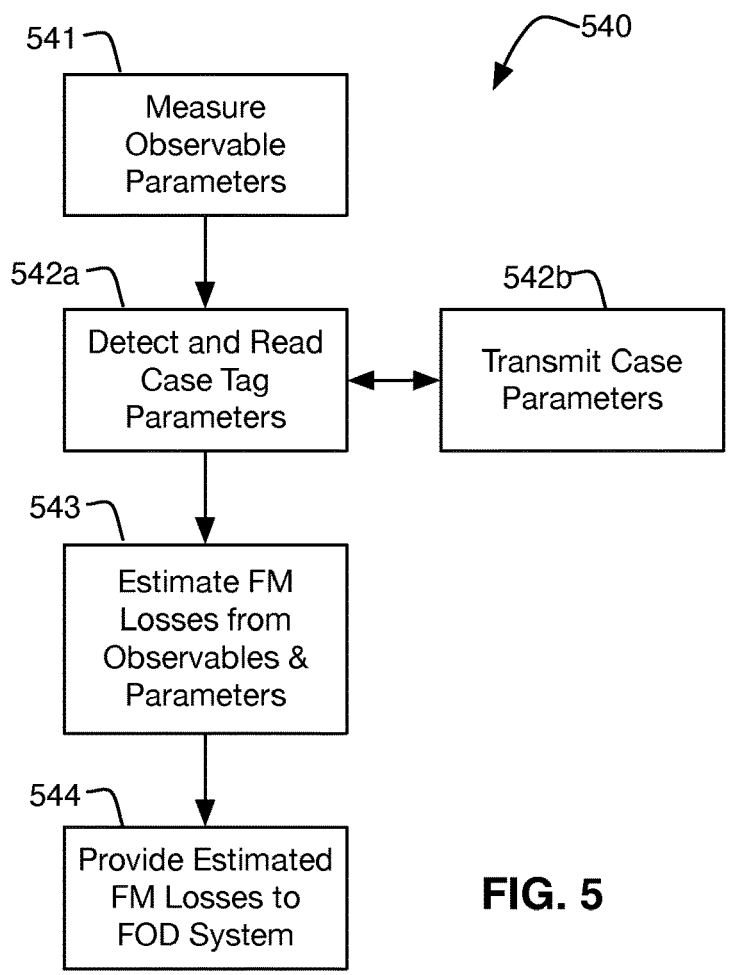
FIG. 5

CASE DETECTION FOR WIRELESS POWER TRANSFER LOSS ESTIMATION

CROSS-REFERENCE TO RELATED APPLICATIONS

This application claims the benefit of U.S. Provisional Application No. 63/376,230, filed Sep. 19, 2022, entitled "CASE DETECTION FOR WIRELESS POWER TRANSFER LOSS ESTIMATION," which is hereby incorporated by reference in its entirety for all purposes.

BACKGROUND

Wireless power transfer ("WPT"), such as inductive power transfer ("IPT"), may be used to provide power for charging various battery-powered electronic devices. One application in which WPT has seen increases in use is the consumer electronics space around devices such as mobile phones (i.e., smart phones) and their accessories (e.g., wireless earphones, smart watches, etc.) as well as tablets and other types of portable computers and their accessories (e.g., styluses, etc.). Such WPT systems may employ foreign object detection ("FOD") systems that attempt to identify conductive objects separate from the wireless power transmitter and wireless power receiver, so that the transferred wireless power can be regulated to prevent unnecessarily delivering power to such objects.

SUMMARY

Some FOD systems employ estimates of "friendly metal" losses, which are losses associated with the conductive components of the WPT devices apart from the WPT system itself. Accurately estimating these friendly metal losses can be complicated by unknown parameters relating to the WPT system in operation, such as the relative positioning of the WPT devices, variation as between different WPT devices, etc. Therefore, it may be desirable to develop improved friendly metal loss estimation techniques for implementation in WPT FOD systems.

A wireless power transfer device can include a coil that couples to a corresponding coil of a counterpart device to facilitate wireless power transfer, a power converter coupled to the coil, and controller and communication circuitry that monitors one or more observable parameters associated with the wireless power transfer to detect a presence of a foreign object that is not the counterpart device and controls the power converter responsive to detection of the foreign object. The controller and communication circuitry can perform foreign object detection based on power accounting that includes estimating friendly metal losses associated with the counterpart device. The controller and communication circuitry can interrogate a machine readable tag associated with a case of the counterpart device and can receive from the machine readable tag information about the presence or properties of the case. The machine readable tag can be an NFC tag.

The properties of the case include friendly metal loss modeling parameters associated with the case. The modeling parameters include one or more coefficients relating to a wireless power transfer current and one or more coefficients relating to at least one of a wireless power transfer current or a wireless power transfer voltage.

The wireless power transfer device can be a wireless power transmitter. The counterpart wireless power transfer device can be a wireless power receiver. The power converter can be an inverter. The control circuitry can control the power converter responsive to detection of a foreign object by at least one of reducing or limiting the amount of power transferred, interrupting power transfer, or providing an alert to a user.

The controller and communication circuitry performs foreign object detection based on power accounting by: subtracting power received by the wireless power receiver from power transmitted by the wireless power transmitter to obtain a measured power loss, estimating friendly metal losses using the information about the presence or properties of the case, calculating net foreign object losses by subtracting the estimated friendly metal losses from the measured power loss, and determining that a foreign object is present if the net foreign object losses exceed a threshold. Estimating friendly metal losses using the information about the presence or properties of the case can further include using a model relating observable circuit parameters to friendly metal losses using the received information.

A method of foreign object detection in a wireless power transfer system including a wireless power transmitter and a wireless power receiver can be performed by control and communication circuitry of either the wireless power transmitter or the wireless power receiver, and can include subtracting power received by the wireless power receiver from power transmitted by the wireless power transmitter to obtain a measured power loss, estimating friendly metal losses including using friendly metal loss modeling parameters received from a case of a counterpart wireless power transfer device by interrogating a machine readable tag associated with the case to obtain information about the presence or properties of the case, calculating net foreign object losses by subtracting the estimated friendly metal losses from the measured power loss, and determining that a foreign object is present if the net foreign object losses exceed a threshold. The machine readable tag can be an NFC tag.

The properties of the case can include friendly metal loss modeling parameters associated with the case. The modeling parameters can include one or more coefficients relating to a wireless power transfer current and one or more coefficients relating to at least one of a wireless power transfer current or a wireless power transfer voltage.

The method can further include applying a mitigation if a foreign object is present. The mitigation can include at least one of reducing or limiting the amount of power transferred, interrupting power transfer, or providing an alert to a user. The method can be performed by control and communication circuitry of the wireless power transmitter, and the counterpart wireless power transfer device can be the wireless power receiver.

A method of estimating friendly metal losses in a wireless power transfer system including a wireless power transmitter and a wireless power receiver having a case can be performed by control and communication circuitry of either the wireless power transmitter or the wireless power receiver and can include measuring one or more observable parameters of the wireless power transfer system, obtaining friendly metal loss parameters from a corresponding wireless power transfer device including interrogating a machine readable tag associated with the case to obtain information relating to the presence or properties of the case, and estimating friendly metal losses using a model that relates friendly metal losses to the measured observable parameters and the received friendly metal loss parameters including the information relating to the presence or properties of the case. The machine readable tag is an NFC tag.

The properties of the case can include friendly metal loss modeling parameters associated with the case. The modeling parameters can include one or more coefficients relating to a wireless power transfer current and one or more coefficients relating to at least one of a wireless power transfer current or a wireless power transfer voltage. The observable parameters can include one or more of a current of the wireless power transfer system and a voltage of the wireless power transfer system.

The method can be performed by control and communication circuitry of the wireless power transmitter. The counterpart wireless power transfer device can be the wireless power receiver. The current of the wireless power transfer system can be a transmit coil current, and the voltage of the wireless power transfer system can be an inverter voltage.

A case for a wireless power receiver can include a machine readable tag that stores and, in response to interrogation, provides information about the presence or properties of the case. The machine readable tag can be an NFC tag. The NFC tag can be embedded in the case. The properties of the case can include friendly metal loss modeling parameters associated with the case. The modeling parameters can include one or more coefficients relating to a wireless power transfer current and one or more coefficients relating to at least one of a wireless power transfer current or a wireless power transfer voltage.

BRIEF DESCRIPTION OF THE DRAWINGS

FIG. 1 illustrates a block diagram of a wireless power transfer system.

FIGS. 2A-2C illustrate various configurations of a wireless power transfer system.

FIGS. 4A-4B illustrate an exemplary physical configuration of a wireless power transfer system FIG. 5 illustrates a flowchart of a friendly metal loss estimation technique.

DETAILED DESCRIPTION

Figure 3:
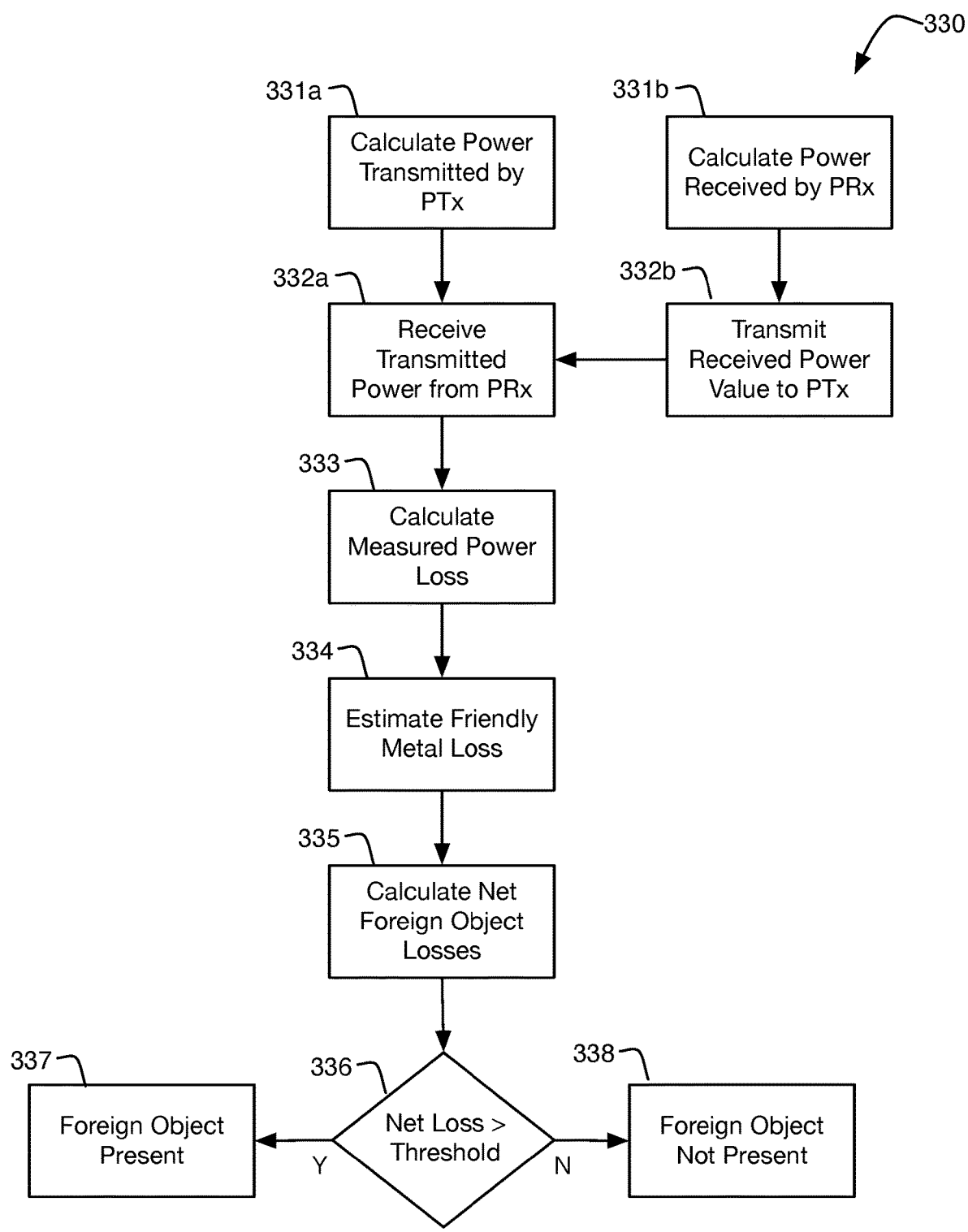
FIG. 3 depicts a simplified flow chart of a foreign object detection technique based on power accounting.

In the following description, for purposes of explanation, numerous specific details are set forth to provide a thorough understanding of the disclosed concepts. As part of this description, some of this disclosure's drawings represent structures and devices in block diagram form for sake of simplicity. In the interest of clarity, not all features of an actual implementation are described in this disclosure. Moreover, the language used in this disclosure has been selected for readability and instructional purposes, has not been selected to delineate or circumscribe the disclosed subject matter. Rather the appended claims are intended for such purpose.

Various embodiments of the disclosed concepts are illustrated by way of example and not by way of limitation in the accompanying drawings in which like references indicate similar elements. For simplicity and clarity of illustration, where appropriate, reference numerals have been repeated among the different figures to indicate corresponding or analogous elements. In addition, numerous specific details are set forth to provide a thorough understanding of the implementations described herein. In other instances, methods, procedures, and components have not been described in detail so as not to obscure the related relevant function being described. References to "an," "one," or "another" embodiment in this disclosure are not necessarily to the same or different embodiment, and they mean at least one. A given figure may be used to illustrate the features of more than one embodiment, or more than one species of the disclosure, and not all elements in the figure may be required for a given embodiment or species. A reference number, when provided in a drawing, refers to the same element throughout the several drawings, though it may not be repeated in every drawing. The drawings are not to scale unless otherwise indicated, and the proportions of certain parts may be exaggerated to better illustrate details and features of the present disclosure.

FIG. 1 illustrates a simplified block diagram of a wireless power transfer system 100. Wireless power transfer system includes a power transmitter (PTx) 110 that transfers power to a power receiver (PRx) 120 wirelessly, such as via inductive coupling 130. Power transmitter 110 may receive input power that is converted to an AC voltage having particular voltage and frequency characteristics by an inverter 114. Inverter 114 may be controlled by a controller/communications module 116 that operates as further described below. In various embodiments, the inverter controller and communications module may be implemented in a common system, such as a system based on a microprocessor, microcontroller, or the like. In other embodiments, the inverter controller may be implemented by a separate controller module and communications module that have a means of communication between them. Inverter 114 may be constructed using any suitable circuit topology (e.g., full bridge, half bridge, etc.) and may be implemented using any suitable semiconductor switching device technology (e.g., MOSFETS, IGBTs, etc. made using silicon, silicon carbide, or gallium nitride devices).

Inverter 114 may deliver the generated AC voltage to a transmitter coil 112. In addition to a wireless coil allowing magnetic coupling to the receiver, the transmitter coil block 112 illustrated in FIG. 1 may include tuning circuitry, such as additional inductors and capacitors, that facilitate operation of the transmitter in different conditions, such as different degrees of magnetic coupling to the receiver, different operating frequencies, etc. The wireless coil itself may be constructed in a variety of different ways. In some embodiments, the wireless coil may be formed as a winding of wire around a suitable bobbin. In other embodiments, the wireless coil may be formed as traces on a printed circuit board. Other arrangements are also possible and may be used in conjunction with the various embodiments described herein. The wireless transmitter coil may also include a core of magnetically permeable material (e.g., ferrite) configured to affect the flux pattern of the coil in a way suitable to the particular application. The teachings herein may be applied in conjunction with any of a wide variety of transmitter coil arrangements appropriate to a given application.

PTx controller/communications module 116 may monitor the transmitter coil and use information derived therefrom to control the inverter 114 as appropriate for a given situation. For example, controller/communications module may be configured to cause inverter 114 to operate at a given frequency or output voltage depending on the particular application. In some embodiments, the controller/communications module may be configured to receive information from the PRx device and control inverter 114 accordingly. This information may be received via the power transmission coils (i.e., in-band communication) or may be received via a separate communications channel (not shown, i.e., out-of-band communication). For in-band communication, controller/communications module 116 may detect and decode signals imposed on the magnetic link (such as voltage, frequency, or load variations) by the PRx to receive information and may instruct the inverter to modulate the delivered power by manipulating various parameters of the generated voltage (such as voltage, frequency, etc.) to send information to the PRx. In some embodiments, controller/communications module may be configured to employ frequency shift keying (FSK) communications, in which the frequency of the inverter signal is modulated, to communicate data to the PRx. Controller/communications module 116 may be configured to detect amplitude shift keying (ASK) communications or load modulation-based communications from the PRx. In either case, the controller/communications module 126 may be configured to vary the current drawn on the receiver side to manipulate the waveform seen on the Tx coil to deliver information to and from the PRx to the PTx. For out-of-band communication, additional modules that allow for communication between the PTx and PRx may be provided, for example, WiFi, Bluetooth, or other radio links or any other suitable communications channel.

As mentioned above, controller/communications module 116 may be a single module, for example, provided on a single integrated circuit, or may be constructed from multiple modules/devices provided on different integrated circuits or a combination of integrated and discrete circuits having both analog and digital components. The teachings herein are not limited to any particular arrangement of the controller/communications circuitry.

PTx device 110 may optionally include other systems and components, such as a separate communications ("comms") module 118. In some embodiments, comms module 118 may communicate with a corresponding module tag in the PRx via the power transfer coils. In other embodiments, comms module 118 may communicate with a corresponding module using a separate physical channel 138.

As noted above, wireless power transfer system also includes a wireless power receiver (PRx) 120. Wireless power receiver can include a receiver coil 122 that may be magnetically coupled 130 to the transmitter coil 112. As with transmitter coil 112 discussed above, receiver coil block 122 illustrated in FIG. 1 may include tuning circuitry, such as additional inductors and capacitors, that facilitate operation of the transmitter in different conditions, such as different degrees of magnetic coupling to the receiver, different operating frequencies, etc. The wireless coil itself may be constructed in a variety of different ways. In some embodiments, the wireless coil may be formed as a winding of wire around a suitable bobbin. In other embodiments, the wireless coil may be formed as traces on a printed circuit board. Other arrangements are also possible and may be used in conjunction with the various embodiments described herein. The wireless receiver coil may also include a core of magnetically permeable material (e.g., ferrite) configured to affect the flux pattern of the coil in a way suitable to the particular application. The teachings herein may be applied in conjunction with any of a wide variety of receiver coil arrangements appropriate to a given application.

Receiver coil 122 outputs an AC voltage induced therein by magnetic induction via transmitter coil 112. This output AC voltage may be provided to a rectifier 124 that provides a DC output power to one or more loads associated with the PRx device. Rectifier 124 may be controlled by a controller/communications module 126 that operates as further described below. In various embodiments, the rectifier controller and communications module may be implemented in a common system, such as a system based on a microprocessor, microcontroller, or the like. In other embodiments, the rectifier controller may be implemented by a separate controller module and communications module that have a means of communication between them. Rectifier 124 may be constructed using any suitable circuit topology (e.g., full bridge, half bridge, etc.) and may be implemented using any suitable semiconductor switching device technology (e.g., MOSFETs, IGBTs, etc. made using silicon, silicon carbide, or gallium nitride devices).

PRx controller/communications module 126 may monitor the receiver coil and use information derived therefrom to control the rectifier 124 as appropriate for a given situation. For example, controller/communications module may be configured to cause rectifier 124 to operate to provide a given output voltage depending on the particular application. In some embodiments, the controller/communications module may be configured to send information to the PTx device to effectively control the power delivered to the receiver. This information may be received or sent via the power transmission coils (i.e., in-band communication) or may be sent via a separate communications channel (not shown, i.e., out-of-band communication). For in-band communication, controller/communications module 126 may, for example, modulate load current or other electrical parameters of the received power to send information to the PTx. In some embodiments, controller/communications module 126 may be configured to detect and decode signals imposed on the magnetic link (such as voltage, frequency, or load variations) by the PTx to receive information from the PTx. In some embodiments, controller/communications module 126 may be configured to receive frequency shift keying (FSK) communications, in which the frequency of the inverter signal has been modulated to communicate data to the PRx. Controller/communications module 126 may be configured to generate amplitude shift keying (ASK) communications or load modulation-based communications from the PRx. In either case, the controller/communications module 126 may be configured to vary the current drawn on the receiver side to manipulate the waveform seen on the Tx coil to deliver information from the PRx to the PTx. For out-of-band communication, additional modules that allow for communication between the PTx and PRx may be provided, for example, WiFi, Bluetooth, or other radio links or any other suitable communications channel.

As mentioned above, controller/communications module 126 may be a single module, for example, provided on a single integrated circuit, or may be constructed from multiple modules/devices provided on different integrated circuits or a combination of integrated and discrete circuits having both analog and digital components. The teachings herein are not limited to any particular arrangement of the controller/communications circuitry.

PRx device 120 may optionally include other systems and components, such as a communications module 128. In some embodiments, comms module 128 may communicate with a corresponding module in the PTx via the power transfer coils. In other embodiments, comms module 128 may communicate with a corresponding module or tag using a separate physical channel 138.

Numerous variations and enhancements of the above-described wireless power transmission system 100 are possible, and the following teachings are applicable to any of such variations and enhancements.

Wireless power transfer as described above depends on the degree of electromagnetic coupling between the PTx and the PRx. For example, in inductive charging systems, the transmitter coil 112 and the receiver coil 122 may be thought of as a loosely coupled transformer. As such, the relative position of the PTx and PRx can affect the degree of magnetic coupling between the PTx and PRx, which, in turn, can affect the power transfer capability of the system. FIG. 2A illustrates a simplified diagram of a PTx (110)-PRx (120) system. Both devices are illustrated in plan view (upper part of the diagram) and an edge-on section view (lower part of the diagram). PTx device 110 includes transmitter coil 112, and PRx device 120 includes a receiver coil 122. In some embodiments, PTx device 110 may be a wireless charging pad, mat, or stand (or other wireless power transfer device), and PRx device 120 may be a mobile phone, tablet computer, smart watch, (or other wireless power receiver device). Although the respective devices are depicted as generally rectangular in shape with generally circular charging coils, it is to be appreciated that other configurations are also possible.

FIG. 2B illustrates the PTx 110 and PRx 120 in an "optimal" alignment. In FIG. 2B, the devices—and more specifically, their wireless power transfer coils—are horizontally aligned (as depicted in the plan view), vertically aligned, and as close together as possible (as illustrated in the sectional view). In this context, horizontal and vertical are merely used as terms of convenience, and the true orientation of the system may vary, and the following description is applicable to a system in any such orientation, although "horizontal" and "vertical" will continue to be used for contextual clarity. FIG. 2C illustrates the devices with a slight misalignment. More specifically, there is a radial displacement "r" that can be appreciated by noting that the centers of coils 112 and 122 are no-longer co-incident in the plan view. Such radial displacement may be caused by any number of things, for example, a user slightly misplacing a phone with respect to a charging pad. Furthermore, there is also a vertical displacement "z" that can be appreciated by noting the separation between PTx device 110 and PRx device 120 in the sectional view. This vertical displacement may also be caused by any number of things, for example, a phone enclosed in a case or cover. The sectional view also illustrates the lateral/radial displacement. It will be appreciated that in some situations, only a radial displacement or only a vertical displacement may be present.

The offsets described above can reduce the degree of magnetic coupling between the PTx and PRx devices. This reduced magnetic coupling can limit the amount of power that can be delivered from PTx 110 to PRx 120. More specifically, reduced coupling between PTx 110 and PRx 120 reduces the fraction of the power transmitted from PTx 110 that is received by PRx 120. Additionally, a reduced degree of magnetic coupling between PTx 110 and PRx 120 may be at least partially addressed by re-tuning the receiver (or transmitter) circuitry accordingly. For example, one or more tuning capacitors may be included in the PTx circuitry between inverter 114 and transmitter coil 112. Likewise, one or more tuning capacitors may be included in the PRx circuitry between rectifier 124 and receiver coil 122. The function of these respective capacitors is tuning the circuit by adjusting the resonant frequency of the respective circuits, and they may include, for example, series resonant capacitors in series with the respective coils or parallel resonant capacitors in parallel with the respective coils, depending on the particular designed operating modes of the circuit. To that end, multiple selectable capacitors may be provided on either or both of PTx 110 and PRx 120, with the appropriate tuning capacitance being selected by the respective device based on estimates of coupling factor derived from various observable circuit parameters, such as voltages, currents, etc.

In wireless power transfer systems, it may be desirable to detect the presence of "foreign objects." For example, things like coins, keys, paperclips, etc. that end up in proximity to the wireless power transfer coils can receive a portion of the power that is transmitted by a PTx 110, which both reduces the power available to PRx 120 and may lead to undesired heating of the foreign objects. Wireless power transfer systems can employ a variety of foreign object detection ("FOD") techniques. One group of FOD techniques is based on power accounting. The basic principle of power accounting is as follows: the power transmitted by PTx 110, less the power received by PRx 120 is "lost" power. This lost power can be thought of as going into one of three places. Some power may be absorbed by so-called "friendly metal" of PTx 110. Some power may be absorbed by friendly metal of PRx 120. Some power may be absorbed by a foreign object. "Friendly metal" in this context means the metallic or otherwise conductive structures that make up a PTx and a PRx. These may be frames or case portions, internal circuit elements, magnets, etc. These elements are designated as friendly metal because their presence is known to and accounted for in the design of the wireless power transfer system. Losses that are not associated with the friendly metal may be assumed to be associated with a foreign object.

FIG. 3 depicts a simplified flow chart of a foreign object detection technique 330 based on power accounting. Beginning with block 331a, PTx 110 calculates power transmitted by the PTx. This can be achieved by multiplying the output voltage of inverter 114 by the current through transmit coil 112. Correspondingly, block 331b calculates power received by PRx 120. This can be achieved by multiplying the current through receiver coil 122 by the output voltage of rectifier 124. Depending on the efficiency of the inverter and rectifier and how it is accounted for, either their input or output currents and/or voltages could be used. The respective voltages and currents may be monitored sensors coupled to the respective controller circuitry located in controller and communications modules 116 (for PTx 110) and 126 (for PRx 120). Implementation of such measurement systems is known to those skilled in the art, and thus is not repeated here.

In block 332b, PRx 120 can communicate the received power value to PTx 110, which it receives as illustrated in block 332a. This discussion assumes that the foreign object detection is performed by PTx 110, for example by circuitry located in controller/communications module 126. However, in some applications, the foreign object detection process could run on PRx 120, in which case PTx 110 could transmit its measured power value to PRx 120. In either case, this could take place either by in-band communication (involving modulation of the voltage, current, frequency, phase, etc. wireless power transferred) or out-of-band communication using separate communications modules 118/128 and separate communications channel 138, which could be near field communication (NFC), Bluetooth communication, WiFi communication, etc. as discussed above. Alternatively, rather than transmit calculated power values, the device could transmit the underlying measurements (e.g., voltage and current measurements) that would allow the counterpart device to calculate the respective power.

In either case, in block 333, the PTx (or PRx, if it is performing foreign object detection) can calculate the measured power loss as the difference between transmitted power and received power. As noted above this measured power loss can include two components: friendly metal losses (associated with either PTx 110 or PRx 120) and foreign object losses. Thus, in block 334, the PTx (or PRx, if it is performing foreign object detection) estimates the friendly metal losses. An exemplary friendly metal loss estimation technique is discussed in greater detail below with respect to FIG. 4. For purposes of this discussion, estimation of the friendly metal losses may be thought of as a computation based on observable circuit parameters (voltages, currents, coupling factors, etc.) and predetermined parameters that relate these observable circuit parameters to the resulting losses. These parameters may be part of a model that can be analytically or empirically derived during the design of a particular wireless power transfer device. These model parameters may be stored in a memory associated with a controller of the respective wireless power transfer device and either used by that device to estimate its friendly metal losses or provided to a counterpart device to allow that device to estimate the friendly metal losses of its counterpart.

Once the friendly metal losses have been estimated/determined (block 334), the device performing the foreign object detection can calculate the net foreign object losses (block 335), which can be the difference between the calculated measured power loss (block 333) and the estimated friendly metal losses (block 334). The net foreign object losses can then be compared to a net loss threshold (block 336). If the net foreign object losses are less than the threshold, then it can be inferred that no foreign object is present (block 338) and no mitigation is required. Alternatively, if the net foreign object losses are greater than the threshold (block 336), then it can be inferred that a foreign object is present (block 337) and some mitigation may be employed. Such mitigations can include reducing or limiting the amount of power transferred, interrupting power transfer, providing an alert to the user, such as an audiovisual alert, etc.

One complication of power accounting based foreign object detection is that the friendly metal losses can make up a substantial portion of the total losses. Put another way, even relatively small levels of foreign object loss may be significant, and thus it is desirable to be able to detect such losses at a level that may be somewhat below the friendly metal losses. Thus, significant degrees of error in estimating friendly metal losses may be undesirable. For example, if the friendly metal loss estimation is significantly too low, then the fraction of total losses associated with the foreign object may be higher than expected, which can result in inefficient charging. Alternatively, if the friendly metal loss estimation is significantly too high, then the fraction of total losses associated with the foreign object may be lower than expected, which can result in unnecessary application of mitigations—such as those discussed above—that can present undesirable user experiences, such as slower or interrupted charging, spurious alerts, etc. These issues may become even more pronounced as typical wireless power levels increase from relatively lower levels (e.g., 5 W or so) to relatively higher levels (e.g., 20 W or more).

One way to estimate friendly metal losses is as a function of the current flowing through PTx transmit coil 112. The friendly metal losses can be measured as a linear function of the square of the transmit coil current, namely:

$$P_{FM} = \alpha_{FM}(I_{TX})^2 + \beta_{FM}$$

where $P_{FM}$ is the estimated friendly metal losses, $\alpha_{FM}$ is a first coefficient and $\beta_{FM}$ is a second coefficient. As noted above, the coefficients may be derived analytically or empirically, e.g., based on a regression model that is linear in $I_{TX}^2$. However, this model can be further refined in two ways. First, a more accurate estimation of friendly metal losses may be obtained by modeling the losses as a function of voltage, not just current. Second, the friendly metal loss model may be modified to account for differing coupling factors. Refinements of this nature are described in Applicant's co-pending U.S. patent application Ser. No. 18/166,839, entitled "Friendly Metal Loss Estimation," filed Feb. 9, 2023, which is hereby incorporated by reference.

As discussed above with respect to FIGS. 2A-2C, misalignment between PTx 110 and PRx 120 can lead to increased wireless power transfer losses. In some cases, the misalignment can be caused by inclusion of a case around one of the devices, e.g., a case around PRx 120. For example, one common PRx device is a smartphone, and it is not uncommon for users to place their phones in some sort of case to provide a degree of protection to the phone. Even if these cases are non-metallic, they can still contribute to increased wireless power transfer losses caused by increased separation distance and/or misalignment. These increased losses associated with the presence of the case can adversely impact the friendly metal loss computation portion of the power accounting foreign object detection technique described above. To overcome these adverse effects, the case can be equipped with an machine-readable tag that can provide the wireless power transfer system, and particularly the foreign object detection system, with information relating to the presence and optionally the characteristics of the case. This information can then be used by the wireless power transfer system, and particularly the foreign object detection system, to adjust the friendly metal loss estimation to account for the presence of the case. Examples of machine-readable tags include radio/wireless tags, such as Zigbee, WiFi, Bluetooth, or Near Field Communication (NFC) tags. Alternatively, the machine readable tag could be an optical tag, such as a bar code, QR code, or other optically readable tag (with corresponding sensor(s) in the PTx or PRx, as appropriate). Similarly, magnetic tags and corresponding sensors could also be used. In the following examples and embodiments, an NFC tag is used as exemplary, but these examples should be read as additionally or alternatively including any other type of machine readable tag, including but not limited to the examples described above.

FIGS. 4A-4B illustrate an exemplary physical configuration of a wireless power transfer system including a PTx 110 and a PRx 120 in which the PRx 120 is at least partially enclosed within a case 420. In one embodiment, this could be a smartphone and associated case, but other devices and case configurations are also possible. The configurations illustrated in FIGS. 4A-4B are similar to those discussed above with respect to FIGS. 2A-2B except for the addition of case 420. Case 420 may surround PRx 120 on multiple sides so that at least a portion of case 420 ends up disposed between PRx 120 and PTx 110 when positioned for wireless power transfer (as illustrated in FIG. 4B). This can increase the vertical separation between wireless power transmitting coil 112 of PTx 110 and the wireless power receiving coil 122 of PRx 120, as illustrated in FIG. 4B, leading to the increased losses described above.

Case 420 can include an NFC tag 422, which can either be embedded within the material of case 420, or affixed to an interior or exterior portion of case 420, as appropriate for a given application. NFC tag 422 is depicted as being positioned in substantial alignment with the wireless power transfer coils, but it could be positioned at any appropriate location with respect to case 420 and the wireless power transfer coils. Additionally, NFC tag 422 is depicted substantially similarly to the wireless power transfer coils, and an NFC tag will typically include a coil for reading information or data from the tag and optionally for programming or writing data from the tag. However, the size and shape of this coil may be configured differently than the wireless power transfer coils depending on the particular operating frequency, etc. of the application. Additionally, NFC tag will include additional circuitry (not shown) that provides the functionality of the tag, including a memory or other suitable circuitry for retaining the information that is written to and/or read from the NFC tag. Numerous NFC tag types and configurations are known to those skilled in the art and any of these various types can be adapted to achieve the functionality described herein.

NFC tag 422 can be read by the wireless power transfer device that is implementing the foreign object detection system. In some cases, this may be PTx 110, particularly control and communication circuitry 116. Depending on the particular design of PTx 110, NFC tag 422 may be read using wireless power transmit coil 112 driven and monitored by control and communication circuitry 116, or a separate out of band communication module 118 may be used for NFC tag reading. In alternative embodiments, the foreign object detection system may be totally or partially implemented by PRx 120, in which case the above-described functionality may be performed by some combination or subset of wireless power receiver coil 122, wireless power controller and communication circuitry 126, and/or out of band communications module 128.

As discussed above, NFC tag 422 can be programmed with information that can allow the foreign object detection system to be aware of the presence of case 420, so that the foreign object detection system can account for the presence of the case, for example in the friendly metal loss estimation portion of the foreign object detection system. This information can be relatively simple, such as identifying just the presence of a case. In that situation, the foreign object detection system can be programmed to adjust its friendly metal loss estimation routine according to this information, for example using assumptions about the effect of the case on the wireless power transfer losses. These assumptions may be provided a priori to the foreign object detection system, e.g., by suitable programming of the appropriate controller and communication circuitry either from the factory or as part of a firmware update. In other situations, the NFC tag can be programmed with additional information that can be used by the foreign object detection system to estimate the friendly metal losses. For example, the tag could be programmed with information relating to the physical parameters of the case, such as its thickness (or other dimensions as appropriate), material, etc. In some cases, the tag could be programmed with coefficients that can be used in a friendly metal loss estimation model as described above, such as coefficients relating to losses associated with the case to a relevant current, voltage, coupling factor, or other parameter of the wireless power transfer system. In some examples, NFC tag 422 works in conjunction with the wireless power controller circuitry 126 in PRx 120 such that NFC communication with the PTx is made in accordance with detection of a coupled PTx device, by controller circuitry 126.

FIG. 5 illustrates a flowchart of a friendly metal loss estimation technique 540. Beginning with block 541, the FOD system can measure observable parameters of the wireless power transfer system. These measurements can be performed by PTx 110, if PTx 110 is implementing the FOD system, or by PRx 120, if PRx 120 is implementing the FOD system. These observable parameters can include wireless power transfer voltages, currents, phase shifts, frequencies, impedances, etc., as well as parameters that can be derived therefrom, such as power consumptions, efficiencies, coupling coefficients, etc. The device implementing the FOD system can perform these measurements using appropriate sensors in combination with the control circuitry of the device, as discussed above.

In block 542*a*, a FOD system implemented by PTx 110 can receive interrogate NFC tag 422 to obtain friendly metal parameters from the NFC tag. (As depicted by block 542*b*, the NFC tag can respond to this interrogation with information relating to the presence or properties of the case, as described above.) This can be in conjunction with or separate from a similar process for obtaining friendly metal parameters from PRx 120 as discussed in Applicant's co-pending application referenced above. In some applications, PRx 120 could interrogate NFC tag 422 and relay appropriate information to PTx 110 (or use it itself if it were implementing the FOD system). As noted above, the interrogation of NFC tag 422 can take place using either in-band or out-of-band communications. The transmitted friendly metal parameters can include information indicating the existence or presence of the case and optionally model coefficients or other information relating to specific properties of the case, as described above. This other information can include model parameters relating to current, voltage, and coupling factor, for example.

In block 543, the FOD system can estimate the friendly metal losses from the observables obtained in block 541 and the received parameters from the case 420/NFC tag 422. The FOD system may also have friendly metal loss modeling parameters associated with itself, which may correspond to the different coupling factors and/or operating frequencies of the received friendly metal loss modeling parameters received from the counterpart device. Then, in block 544, the estimated friendly metal losses can be supplied to the FOD system, such as the one described above with respect to FIG. 3, for foreign object detection.

The foregoing describes exemplary embodiments of wireless power transfer systems that are able to transmit certain information amongst the PTx and PRx in the system. The present disclosure contemplates this passage of information improves the devices' ability to provide wireless power signals to each other in an efficient manner to facilitate battery charging, such as by sharing of the devices' coupling characteristics with one another. Entities implementing the present technology should take care to ensure that, to the extent any sensitive information is used in particular implementations, that well-established privacy policies and/or privacy practices are complied with. In particular, such entities would be expected to implement and consistently apply privacy practices that are generally recognized as meeting or exceeding industry or governmental requirements for maintaining the privacy of users. Implementers should inform users where personally identifiable information is expected to be transmitted in a wireless power transfer system, and allow users to "opt in" or "opt out" of participation. For instance, such information may be presented to the user when they place a device onto a power transmitter, if the power transmitter is configured to poll for sensitive information from the power receiver.

Risk can be minimized by limiting the collection of data and deleting data once it is no longer needed. In addition, and when applicable, data de-identification can be used to protect a user's privacy. For example, a device identifier may be partially masked to convey the power characteristics of the device without uniquely identifying the device. De-identification may be facilitated, when appropriate, by removing identifiers, controlling the amount or specificity of data stored (e.g., collecting location data at city level rather than at an address level), controlling how data is stored (e.g., aggregating data across users), and/or other methods such as differential privacy. Robust encryption may also be utilized to reduce the likelihood that communications between inductively coupled devices are spoofed.

The invention claimed is:

1. A wireless power transfer device comprising:
a wireless power transfer coil that couples to a corresponding coil of a counterpart wireless power transfer device to facilitate wireless power transfer;
a power converter coupled to the wireless power transfer coil; and
controller and communication circuitry that monitors one or more observable parameters associated with the wireless power transfer to detect a presence of a foreign object that is not the counterpart wireless power transfer device and controls the power converter responsive to detection of the foreign object; wherein:
the controller and communication circuitry performs foreign object detection based on power accounting that includes estimating friendly metal losses associated with the counterpart wireless power transfer device; and
the controller and communication circuitry interrogates a machine readable tag associated with a case of the counterpart device and receives, from the machine readable tag, information about the presence or properties of the case.

2. The wireless power transfer device of claim 1 wherein the machine readable tag is an NFC tag.

3. The wireless power transfer device of claim 1 wherein the properties of the case include friendly metal loss modeling parameters associated with the case.

4. The wireless power transfer device of claim 3 wherein the friendly metal loss modeling parameters include one or more coefficients relating to a wireless power transfer current and one or more coefficients relating to at least one of another wireless power transfer current or a wireless power transfer voltage.

5. The wireless power transfer device of claim 1 wherein the wireless power transfer device is a wireless power transmitter, the counterpart wireless power transfer device is a wireless power receiver, the power converter is an inverter, and the controller and communication circuitry controls the power converter responsive to detection of the foreign object by at least one of reducing or limiting an amount of power transferred, interrupting power transfer, or providing an alert to a user.

6. The wireless power transfer device of claim 5 wherein the controller and communication circuitry performs foreign object detection based on power accounting by:
subtracting power received by the wireless power receiver from power transmitted by the wireless power transmitter to obtain a measured power loss;
estimating friendly metal losses using the information about the presence or properties of the case;
calculating net foreign object losses by subtracting the estimated friendly metal losses from the measured power loss; and
determining that a foreign object is present if the net foreign object losses exceed a threshold.

7. The wireless power transfer device of claim 6 wherein estimating friendly metal losses using the information about the presence or properties of the case further comprises using a model relating observable circuit parameters to friendly metal losses using the information.

8. A method of foreign object detection in a wireless power transfer system including a wireless power transmitter and a wireless power receiver, the method being performed by control and communication circuitry of either the wireless power transmitter or the wireless power receiver, the method comprising:
subtracting power received by the wireless power receiver from power transmitted by the wireless power transmitter to obtain a measured power loss;
estimating friendly metal losses including using friendly metal loss modeling parameters received from a case of a counterpart wireless power transfer device by interrogating a machine readable tag associated with the case to obtain information about presence or properties of the case;
calculating net foreign object losses by subtracting estimated friendly metal losses from the measured power loss; and
determining that a foreign object is present if the net foreign object losses exceed a threshold.

9. The method of claim 8 wherein the machine readable tag is an NFC tag.

10. The method of claim 8 wherein the properties of the case include friendly metal loss modeling parameters associated with the case.

11. The method of claim 10 wherein the modeling parameters include one or more coefficients relating to a wireless power transfer current and one or more coefficients relating to at least one of another wireless power transfer current or a wireless power transfer voltage.

12. The method of claim 8 further comprising applying a mitigation if the foreign object is present.

13. The method of claim 12 wherein the mitigation includes at least one of reducing or limiting an amount of power transferred, interrupting power transfer, or providing an alert to a user.

14. The method of claim 8 wherein the method is performed by control and communication circuitry of the wireless power transmitter and the counterpart wireless power transfer device is the wireless power receiver.

15. A method of estimating friendly metal losses in a wireless power transfer system including a wireless power transmitter and a wireless power receiver having a case, the method being performed by control and communication circuitry of either the wireless power transmitter or the wireless power receiver, the method comprising:
measuring one or more observable parameters of the wireless power transfer system;
obtaining friendly metal loss parameters from a corresponding wireless power transfer device including interrogating a machine readable tag associated with the case to obtain information relating to presence or properties of the case; and
estimating friendly metal losses using a model that relates friendly metal losses to the measured observable parameters and the friendly metal loss parameters including the information relating to the presence or properties of the case.

16. The method of claim 15 wherein the machine readable tag is an NFC tag.

17. The method of claim 15 wherein the properties of the case include friendly metal loss modeling parameters associated with the case.

18. The method of claim 17 wherein the modeling parameters include one or more coefficients relating to a wireless power transfer current and one or more coefficients relating to at least one of another wireless power transfer current or a wireless power transfer voltage.

19. The method of claim 15 wherein the observable parameters include one or more of a current of the wireless power transfer system and a voltage of the wireless power transfer system.

20. The method of claim 19 wherein the method is performed by control and communication circuitry of the wireless power transmitter and wherein the current of the wireless power transfer system is a transmit coil current and the voltage of the wireless power transfer system is an inverter voltage.

21. A case for a wireless power receiver comprising a machine readable tag that stores and, in response to interrogation, provides information about properties of the case including friendly metal loss modeling parameters associated with the case.

22. The case of claim 21 wherein the machine readable tag is an NFC tag.

23. The case of claim 22 wherein the NFC tag is embedded in the case.

24. The case of claim 21 wherein the modeling parameters include one or more coefficients relating to a wireless power transfer current and one or more coefficients relating to at least one of another wireless power transfer current or a wireless power transfer voltage.

* * * * *